United States Patent [19]
Taylor et al.

[11] Patent Number: 6,080,504
[45] Date of Patent: Jun. 27, 2000

[54] ELECTRODEPOSITION OF CATALYTIC METALS USING PULSED ELECTRIC FIELDS

[75] Inventors: E. Jennings Taylor, Troy; Maria E. Inman, Englewood, both of Ohio

[73] Assignee: Faraday Technology, Inc., Clayton, Ohio

[21] Appl. No.: 09/184,247

[22] Filed: Nov. 2, 1998

[51] Int. Cl.⁷ .................................................. H01M 4/86
[52] U.S. Cl. ............................... 429/42; 429/40; 429/44; 205/103; 205/104; 205/109
[58] Field of Search ..................... 205/103, 104, 205/109; 429/44, 42, 40; 204/283, 284

[56] References Cited

U.S. PATENT DOCUMENTS

| | | | |
|---|---|---|---|
| 5,041,195 | 8/1991 | Taylor et al. | 429/44 |
| 5,084,144 | 1/1992 | Reddy et al. | 205/104 |
| 5,133,842 | 7/1992 | Taylor et al. | 429/44 |
| 5,433,797 | 7/1995 | Erb et al. | 205/104 |
| 5,486,280 | 1/1996 | Bullock, IV et al. | 205/103 |
| 5,518,831 | 5/1996 | Tou et al. | 429/42 |
| 5,527,445 | 6/1996 | Palumbo et al. | 205/103 |
| 5,605,615 | 2/1997 | Goolsby et al. | 205/103 |
| 5,720,866 | 2/1998 | Erokhine et al. | 205/109 |
| 5,972,192 | 10/1999 | Dubin et al. | 205/104 |

*Primary Examiner*—Bruce F. Bell
*Attorney, Agent, or Firm*—Vorys, Sater, Seymour and Pease

[57] ABSTRACT

A gas diffusion electrode for a proton exchange membrane fuel cell is prepared by electrodeposition of a catalytic metal in nanocrystalline form on a substrate by contacting an electrically conductive substrate and a counterelectrode with a plating bath containing ions of a metal to be deposited on the substrate and passing a pulsed electric current between the substrate and counterelectrode having pulses that are cathodic with respect to the substrate and have a short on-time and/or a short duty cycle with a frequency from about 10 hertz to about 5000 hertz. In a preferred embodiment the electric current is a modulated reversing electric current having pulses that are cathodic with respect to the substrate and pulses that are anodic with respect to the substrate, the cathodic pulses having a short on-time and/or short duty cycle, the charge transfer ratio of the cathodic pulses to the anodic pulses being greater than one, and the frequency of the pulses ranging from about 10 hertz to about 5 kilohertz.

51 Claims, 3 Drawing Sheets

ELECTRODEPOSITION OF CATALYTIC METALS USING PULSED ELECTRIC FIELDS

BACKGROUND OF THE INVENTION

1. Field of the Invention

This invention relates to electrodeposition of metals in a finely divided state and more particularly to electrodeposition of catalytic metals for fuel cell electrodes.

2. Brief Description of the Prior Art

Among the several types of fuel cells under development to provide efficient sources of electrical power with reduced pollution, cells using gas diffusion electrodes (GDEs) with proton exchange membranes as the electrolyte (proton exchange membrane fuel cells, PEMFCs) are seen as having a number of advantages. Such fuel cells avoid the problems of handling liquid fuels and electrolytes because they use gaseous reactants and a solid electrolyte that allows the transfer of protons between electrodes. They have been found to be reliable, efficient and convenient sources of power. However, they have proved to be very expensive in terms of cost per kilowatt of power delivered. As a consequence their practical application has been limited to specialized applications that can justify their considerable expense, e.g., in aerospace applications. If such fuel cells are to achieve wider application, for example as sources of power for automotive propulsion or stationary power plants, the cost in terms of dollars per delivered kilowatt will have to be significantly reduced.

A major factor in the cost of PEMFCs is the expense of the electrodes. The cost of the electrodes is determined by a number of factors, principally the expense of the precious metal catalysts, which are needed for practical efficiency, and the cost of fabricating the electrodes, which is typically conducted by means of a batch process. Furthermore, the cost of the fuel cell system is also greatly affected by the electrochemical performance of the electrodes which determines the power density of the fuel cell, i.e., the power produced per unit area, e.g., kilowatts per square centimeter. The combination of power density, catalyst loading and system fabrication costs determines the ultimate cost per kilowatt of the complete fuel cell system.

Conventional fuel cell electrodes have used unsupported platinum black, having a surface area of about 28 $m^2/g$ with a particle size of about 10 nanometers, at a catalyst loading of about 4 $mg/cm^2$ of electrode area. It is estimated that the amount of precious metal will have to be reduced substantially below 1 $mg/cm^2$ if PEMFCs are to become a widely used source of electric power.

It has been recognized that the amount of precious metal catalyst can be reduced if the metal is present in a more finely divided form. Consequently, electrodes using platinum supported on a granular support, e.g., carbon particles, have been used. Such supported platinum catalysts, prepared by chemical precipitation of the metal onto the granular support, typically have surface areas of about 120 $m^2/g$, with a particle size of about 2–2.5 nanometers, and a catalyst loading of about 0.5 $mg/cm^2$. Although these electrodes use less of the costly platinum catalyst, the power density obtained using such electrodes has been less than satisfactory. Accordingly, the cost of such a fuel cell system is still too high. It is believed that the relatively poor performance, i.e., low power density, is caused by ineffective utilization of the catalyst because a substantial fraction of the platinum is not accessible to the reagents.

A method for depositing precious metal catalyst in finely divided form in a gas diffusion electrode is disclosed in U.S. Pat. No. 5,084,144, to Vilambi-Reddy et al., the entire disclosure of which is incorporated herein by reference. According to the method of U.S. Pat. No. 5,084,144, fine particles of a catalytic metal are deposited electrolytically onto an uncatalyzed layer of carbon particles, bonded with a fluorocarbon resin and impregnated with the proton exchange resin, by contacting the face of the electrode with a plating bath and using pulsed direct current. The gas diffusion electrodes prepared by the process of U.S. Pat. No. 5,084,144 contained about 0.05 $mg/cm^2$ of platinum as particles of about 3.5 nanometers in diameter having a surface area of about 80 $m^2/g$. Such electrodes functioned about as well as the electrodes using supported platinum with a loading of 0.5 $mg/cm^2$ of platinum. It is believed that these electrodes achieved their improved mass activity, i.e., current per weight of platinum, because the electrolytic process deposits the catalyst particles only at regions with both electronic and ionic accessibility. Such locations are expected to be accessible to the protons and electrons required for the fuel cell reactions. However, such improved mass activity does not compensate for the low catalyst loading provided by the process of U.S. Pat. No. 5,084,144. Consequently, the power density of such electrodes is still insufficient to permit the wide use of PEMFCs as sources of electric power.

Accordingly, a need has continued to exist for a method of depositing catalytic metals in gas diffusion electrodes in amounts greater than hitherto achieved, while retaining the small particle size and electronic and ionic accessibility that provides high mass activity.

SUMMARY OF THE INVENTION

The problems encountered in electrodeposition of a catalytic metal in nanocrystalline form on a substrate have now been alleviated by the process of this invention wherein an electrically conductive substrate and a counterelectrode are contacted with a plating bath containing ions of a metal to be deposited on the substrate and a modulated electric current is passed through the plating bath having pulses that are cathodic with respect to the substrate, the cathodic pulses having a short on-time and/or short duty cycle and the frequency of the pulses ranging from about 10 hertz to about 5 kilohertz. In a preferred embodiment anodic pulses may be interposed between at least some of the cathodic pulses.

Accordingly, it is an object of the invention to provide an electrochemical method for depositing a metal on a substrate.

A further object is to provide a method for preparing gas diffusion electrodes having high catalytic activity.

A further object is to provide a gas diffusion electrode having high catalytic activity.

A further object is to provide a gas diffusion electrode having a metallic catalyst in finely divided form.

A further object is to provide a method for electrodepositing a catalyst on a substrate in finely divided form.

A further object is to provide a method of preparing a gas diffusion electrode that can provide adequate power density in a proton exchange membrane fuel cell with economical catalyst loading.

A further object is to provide a method of preparing a gas diffusion electrode by a continuous electroplating process.

Further objects of the invention will become apparent from the description of the invention which follows.

DETAILED DESCRIPTION OF THE INVENTION AND PREFERRED EMBODIMENTS

Figure 1A:
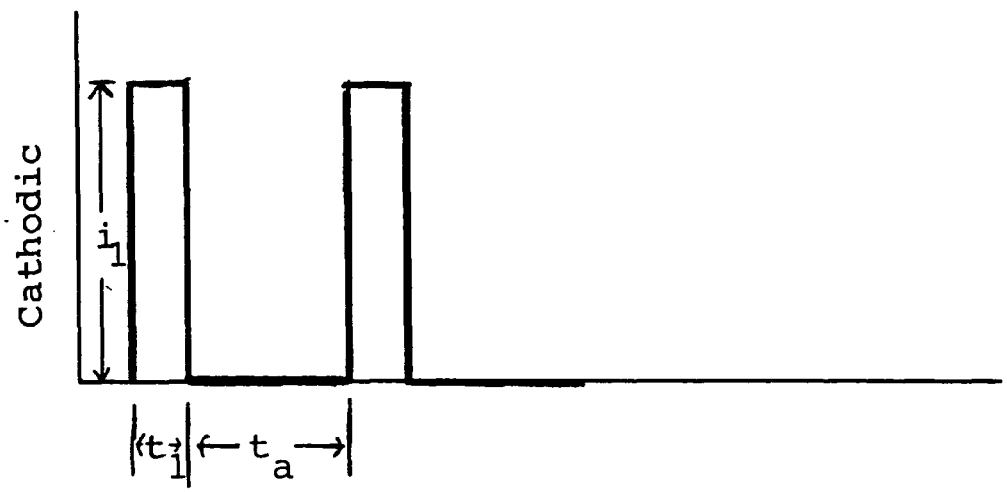
FIG. 1A illustrates a pulse current waveform used in the method of the invention.

Economical manufacture of proton exchange membrane fuel cells (PEMFCs) using platinum-catalyzed gas diffusion electrodes (GDEs) requires electrodes that combine a low platinum loading with high catalytic efficiency. Achieving this goal requires that the platinum catalyst have a large surface area exposed to contact with the reagents and the electrolyte. Large surface area combined with low catalyst loading can be achieved by incorporating the catalytic metal into the electrode as very small particles, i.e., a form of the metal having a high specific surface area. Typically this is accomplished by depositing the metal as small particles on an electrically conductive support, e.g., finely divided carbon. Assuring effective catalysis of the fuel cell reaction requires that the catalyst particles be in contact with the solid electrolyte as well as the electrically conductive support and that the reagents have ready access to the catalyst.

According to the invention a gas diffusion electrode (GDE) having low catalyst loading and good availability of catalyst to reagents is prepared by an electrodeposition process. A GDE according to the invention may be prepared by first applying to an electrically conductive, gas-permeable backing layer a layer of conductive particles, e.g., carbon particles, as a catalyst support, using as a binder for the carbon particles a proton exchange polymer. Then, small particles of a catalytic metal or alloy are deposited electrolytically by contacting the catalytic face of the electrode with an electrolyte containing the metal to be deposited. The electrolyte bath contains a counter-electrode, which may be an inert electrode. An electric current is passed between the counterelectrode and the membrane electrode in order to deposit the catalytic metal on the surface of the carbon particles within the binding ionomer.

In the electrodeposition of a metal on the surface of a conducting substrate, the first step is the electrolytic reduction of metal ions in the solution immediately adjacent to the substrate to metal atoms and the deposition of these atoms on the surface as adatoms. The adatoms then aggregate into small nuclei that form the centers for further deposition of metal from the plating bath. Because the overpotential required for nucleation is significantly greater than that for deposition of metal on previously formed nuclei, crystal growth on the nuclei is favored over the formation of additional nuclei. Consequently, in conventional electrolytic deposition, the catalytic metal tends to be deposited in relatively large crystals having a relatively small specific surface area. This inefficient use of catalyst is responsible for the high catalyst loading hitherto needed in gas diffusion electrodes. Furthermore, merely depositing more catalytic metal by extending the electrodeposition period has resulted in relative loss of mass activity, because the additional metal merely increases the size of the particles already available, with resulting decrease in surface area per unit mass of catalyst and corresponding loss in catalytic efficiency.

According to the invention, deposition of the catalytic metal or alloy as small particles is favored by conducting the electrolytic deposition on a cathodic substrate using a pulsed electric field with short on-time and/or short duty cycle. In a preferred embodiment a reversing electric field pulse (anodic) may be interposed between at least some of the forward pulses.

A schematic representation of a rectangular modulated electric field waveform used in the process of the invention is illustrated in FIG. 1A. The waveform comprises a train of cathodic pulses having a short on-time and/or a short duty cycle.

Figure 1B:
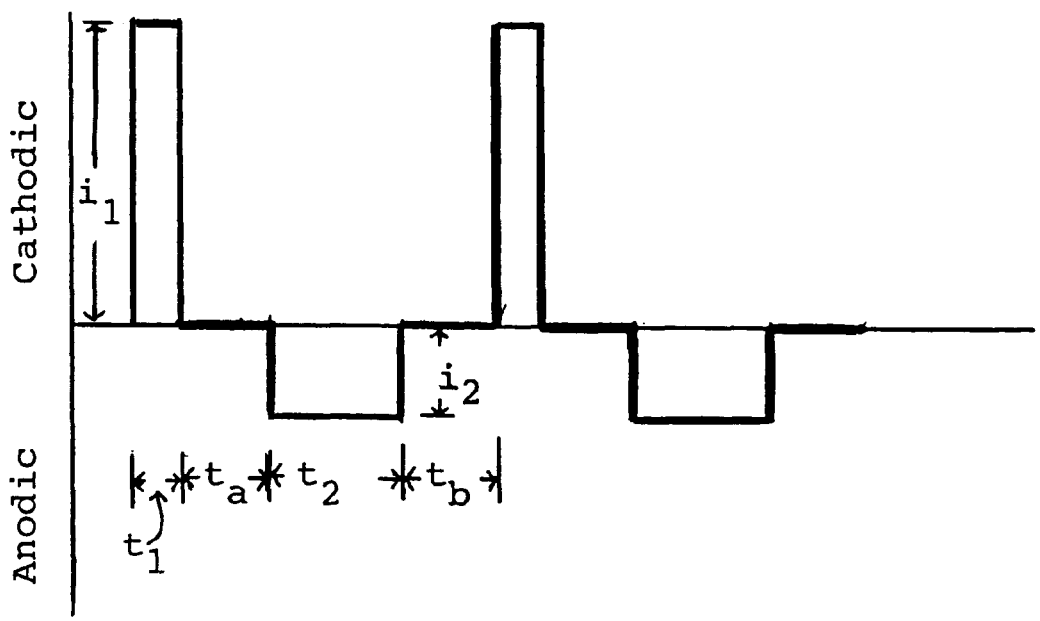
FIG. 1B illustrates a waveform of modulated reverse electric current used in a preferred embodiment of the method of the invention.

A schematic representation of a rectangular modulated reverse electric field waveform used in a preferred process of the invention is illustrated in FIG. 1B. The waveform of FIG. 1B essentially comprises a cathodic (forward) pulse followed by an anodic (reverse) pulse. An off-period or relaxation period may follow either or both of the cathodic and anodic pulses. Those skilled in the art will recognize that the voltage and current will be proportional under the circumstances of the electrolytic process of the invention. Accordingly, the ordinate in FIGS. 1A and 1B could represent either current or voltage. Although it is generally more convenient in practice to control the voltage, the technical disclosure of the process is more straightforward if discussed in terms of the current flow. Furthermore, the waveform need not be rectangular as illustrated. The cathodic and anodic pulses may have any voltage-time (or current-time) profile. In the following discussion rectangular pulses are assumed for simplicity. Again, one skilled in the art will recognize that the point in time chosen as the initial point of the pulse train is entirely arbitrary. Either the cathodic pulse or the anodic pulse (or any point in the pulse train) could be considered as the initial point. The representation with the cathodic initial pulse is introduced for simplicity in discussion.

In FIG. 1, the cathodic peak current is shown as $i_1$ and the cathodic on-time is $t_1$. Similarly, the anodic peak current is shown as $i_2$ and the anodic on-time is $t_2$. The relaxation time, or off-times are indicated by $t_a$ and $t_b$. The sum of the cathodic on-time, anodic on-time, and off-times (if present) is the period T of the pulse train ($T = t_1 + t_2 + t_a + t_b$), and the inverse of the period of the pulse train (1/T) is the frequency (f) of the pulse train. The ratio of the cathodic on-time to the period ($t_1/T$) is the cathodic duty cycle ($D_1$), and the ratio of the anodic on-time to the period ($t_2/T$) is the anodic duty cycle ($D_2$). The current density, i.e., current per unit area of the electrode, during the cathodic on-time and anodic on-time is known as the cathodic peak pulse current density and anodic peak pulse current density, respectively. The cathodic charge transfer density ($Q_1$) is the product of the cathodic current density and the cathodic on-time ($i_1 t_1$), while the anodic charge transfer density ($Q_2$) is the product of the anodic current density and the anodic on-time ($i_2 t_2$). The average current density ($i_{ave}$) is the average cathodic current density ($i_1 t_1$) minus the average anodic current density ($i_2 t_2$). Accordingly the relationships among the parameters may be represented by the following equations.

$$T = \frac{1}{f} = t_1 + t_2 + t_a + t_b \quad (1)$$

$$D_1 = \frac{t_1}{T} \quad (2)$$

$$D_2 = \frac{t_2}{T} \quad (3)$$

$$\frac{Q_1}{Q_2} = \frac{i_1 t_1}{i_2 t_2} \quad (4)$$

$$i_{ave} = i_1 D_1 - i_2 D_2 \quad (5)$$

$$D_1 + D_2 \leq 1 \quad (6)$$

According to the invention the cathodic duty cycle should be relatively short, less than about 40%, and the cathodic pulses should be relatively short to favor nucleation over deposition of additional metal on preexisting nuclei. Preferably, the cathodic on-time should range from about 2 microseconds to about 40 milliseconds, preferably from about 2 microseconds to about 8 milliseconds, and more preferably from about 3 microseconds to about 4 milliseconds. The cathodic duty cycle is from about 1% to about 30%, more preferably from about 2% to about 15% and still more preferably from about 5% to about 30%.

If anodic pulses are included in the pulsed wave train, the anodic on-time and duty cycle may vary widely. Typically, the anodic duty cycle is less than 90%, preferably from about 1% to about 90%, more preferably about 15% to about 50%, more preferably from about 20% to about 40%. The anodic on-time may also vary widely and will in general be determined by the anodic duty cycle and the frequency.

The cathodic-to-anodic net charge ratio will be greater than one, in order to provide a net deposition of metal on the surface.

The frequency of the pulse train used in the method of the invention may range from about 10 hertz to about 5000 hertz, preferably from about 50 Hz to about 5000 Hz, more preferably from about 100 Hz to about 3000 Hz, and still more preferably from about 500 hertz to about 1500 hertz.

In a preferred embodiment of the invention an anodic pulse is introduced between at least some of the cathodic pulses. However, it is not excluded that two or more cathodic pulses may occur between a pair of anodic pulses. The period of a pulse train comprised of such pulse groups may conveniently be defined as the time from the beginning of one cathodic pulse to the beginning of the next cathodic pulse that is similarly situated in the pulse train. The frequency of the pulse train may then be defined as the reciprocal of the period, as discussed above.

The pulse width, duty cycle, and applied voltage of the cathodic and anodic pulses must be adjusted to provide that the overall process is cathodic, i.e., there is a net deposition of metal on the substrate catalyst support. The practitioner will adapt the pulse width, duty cycle, and frequency to a particular application, based on the principles and teachings of the process of the invention.

The application of the method of the invention to preparing gas diffusion electrodes is illustrated in FIG. 2A, FIG. 2B, FIG. 3 and FIG. 4.

Figure 2A:
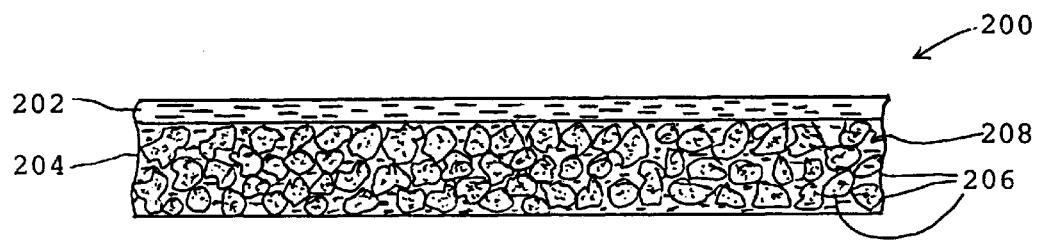
FIG. 2A illustrates a cross-section of the catalyst support structure of the gas diffusion electrode of the invention before the catalytic metal is deposited.

FIG. 2A illustrates an uncatalyzed gas diffusion electrode (GDE), i.e., a gas diffusion electrode before the catalytic metal is deposited thereon. The uncatalyzed GDE 200 comprises an electrically conductive backing layer 202 to which is adhered a catalytic layer 204 comprising particles 206 of an electrically conductive catalyst support, e.g., carbon particles, which are in electrical contact with one another and with the backing layer 202. The backing layer 202 may be any porous electrically conducting material that will permit reactant gas to diffuse therethrough to contact the supported catalyst. The backing layer 202 is typically a carbon paper or carbon cloth that has been rendered hydrophobic by coating with a fluorocarbon polymer by conventional procedures. The catalyst support particles 206 may be any electrically conductive particles that can accept nanocrystals of a catalytic metal such as platinum. The catalyst support particles 206 are distributed in a binder 208 comprising a proton exchange resin. Such resins are well known and may be, for example, a perfluorosulfonate ionomer such as that sold by E. I. du Pont de Nemours & Co. under the trade name Nafion®. The catalyst support layer 204 may be prepared by the conventional procedure of dispersing the catalyst support particles 206 in a solution of the proton exchange resin 208, coating the solution onto the backing layer 202, and drying the coated layer. The dried layer maybe subjected to a heat treatment to improve its physical characteristics. Although FIG. 2A shows a preferred embodiment of the invention wherein the uncatalyzed catalyst support particles are dispersed in a proton exchange resin that serves as both binder and electrolyte, those skilled in the art will understand that the process of the invention is also applicable to gas diffusion electrodes wherein the catalyst support particles are bonded to the backing layer by an inert binder, e.g., a fluorocarbon polymer resin, and the proton exchange resin is subsequently applied by a conventional procedure such as coating, spraying, painting, impregnation or the like. For example the uncatalyzed gas diffusion electrode may be prepared by the process of U.S. Pat. No. 5,211,984, to Wilson, or U.S. Pat. No. 5,234,777, to Wilson, both of which are incorporated herein by reference.

Figure 3:
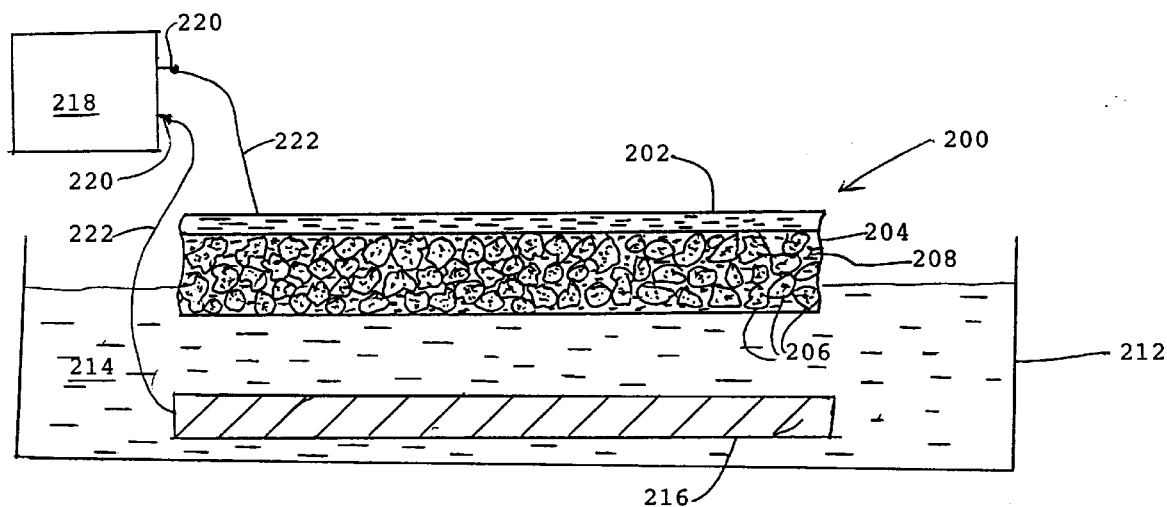
FIG. 3 illustrates schematically a cross section of an electroplating cell arranged for electrodeposition of a catalytic metal onto the catalyst support member.

The uncatalyzed gas diffusion electrode 200 is impregnated with a catalytic metal by the process of the invention as illustrated in FIG. 3. An electroplating cell 212 is prepared having a counterelectrode 216 and containing a plating bath 214 comprised of a solution of suitable ions of the catalytic metal to be deposited on the support particles 206. The catalyst support layer 204 of the uncatalyzed GDE 200 is contacted with the surface of the plating bath 214. Care is taken to avoid immersing the backing layer in the bath 214 in order to avoid depositing catalytic metal in inactive locations. The general procedure for electrolytically depositing a metal catalyst onto a gas diffusion electrode is disclosed in U.S. Pat. No. 5,084,144, referred to above. The backing layer 202 and the counter electrode 216 are connected to the terminals 220 of a power supply 218 by connecting wires 222.

The power supply 218 provides a pulsed forward or cathodic voltage having a short on-time and/or short duty cycle to the GDE 200, or a reversing pulsed voltage wherein the forward pulses have a short duration and typically a short duty cycle.

During the initial cathodic pulse adatoms are deposited on the catalyst support particles 206 and form nuclei for further deposition of the catalytic metal. During the off-time the ions of the catalytic metal can diffuse from the bulk phase toward the GDE and restore the bulk concentration of ions at the surface of the catalyst support particles 206. During subsequent cathodic pulses, the metal ions are deposited both on the preexisting nuclei and on the surface of the catalyst support particles to form additional nuclei. In order to favor the formation of additional nuclei so that the catalyst is deposited as small particles even at high catalyst loadings, the voltage (or current) applied should be relatively large. It is known that the rate of formation of nuclei on a substrate in electrodeposition is governed by the equation $$N = i/kt^3$$

wherein

N=number of nuclei, i=current density corresponding to the nucleation rate, k=nucleation constant, and t=time.

Accordingly, at a given average current, the rate of formation of nuclei is 1) directly proportional to the current density (or inversely proportional to the duty cycle) and 2) inversely proportional to the time (or directly proportional to the frequency). Consequently short on-times and short duty cycles will favor nucleation.

In an alternate embodiment of the invention, an anodic pulse may be introduced between at least some of the cathodic pulses. Preferably, there is an off time ($t_a$ in FIG. 1B) between the cathodic pulse and the following anodic pulse. The off-time allows the replenishment of the metal concentration at the surface of the substrate as pointed out above. During the subsequent anodic pulse some of the metal atoms in the nuclei will be reoxidized and dissolved into the electrolyte. Because the local concentration of the metal ions at the surface of the catalyst support particles 216 is restored to that in the bulk phase during the off time preceding the anodic pulse, the concentration of metal ions adjacent to the surface of the catalytic particles 206 will now exceed the bulk phase concentration. Any metal ions removed from relatively large nuclei formed during the initial pulse may diffuse to adjacent areas of the surface, increasing the metal ion concentration in those areas. During the next cathodic pulse, metal ions close to the surface of the catalytic particles 206 will again be precipitated onto the surface of the particles to form additional nuclei in those locations. Some of the ions will plate onto the existing nuclei, but additional nuclei will also be formed at other points on the surface of the particles 206. Although there may be an off-time ($t_b$ in FIG. 1) between the anodic pulse and the succeeding cathodic pulse to allow for additional lateral diffusion of the metal ions, it is preferred that the anodic pulse be immediately succeeded by a cathodic pulse, (i.e., $t_b$ is preferably zero), so that any redissolved ions do not have time to diffuse back into the bulk phase of the plating bath 214.

Figure 2B:
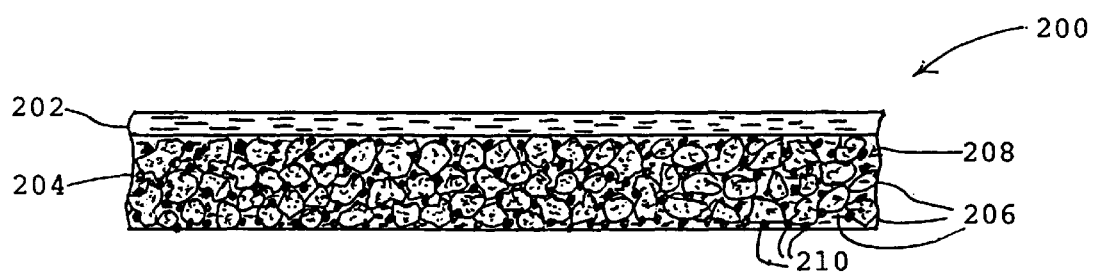
FIG. 2B illustrates a cross-section of the gas diffusion electrode of the invention after the electrodeposition of the catalytic metal.

The catalyzed gas diffusion electrode, i.e., having catalytic metal deposited on the catalyst support particles 206, is shown schematically in FIG. 2B. Catalyst particles 210 are distributed throughout the catalyst support layer 204, supported on the catalyst support particles 206.

According to the invention catalyst particles are deposited in those locations which are accessible to the electrolyte in the plating bath 214 and which have electrical contact with the backing layer through the electrically conductive support particles 206. If the catalyst binder is a proton exchange resin 208, the support layer 204 may be made relatively thin, e.g., not thicker than about 15 micrometers, the gaseous regents can readily diffuse through the proton exchange resin to the catalytic sites. Preferably the support layer 204 has a thickness ranging from about 0.1 micrometer to about 15 micrometers, preferably from about 0.3 micrometers to about 10 micrometers, and more preferably from about 0.3 micrometers to about 6 micrometers.

Alternatively, a catalyst support layer 204 can be prepared using a hydrophobic binder, e.g. a fluoropolymer resin, for the catalyst support particles and coating a layer of a proton exchange resin onto the surface of the layer so prepared. Such catalyst support layers are disclosed in U.S. Pat. No. 5,084,144. Similar catalyst support layers are disclosed in U.S. Pat. No. 4,876,115, to Raistrick (using precatalyzed support particles), the entire disclosure of which is incorporated herein by reference.

When the catalytic metal is platinum, the electrodeposition process is preferably continued until the catalyst loading, i.e., the amount of catalyst per square centimeter of the face of the electrode, ranges from about 0.08 mg/cm$^2$ of the face of the electrode to about 1.0 mg/cm$^2$. Preferably the catalyst amounts to about 0.1 mg/cm$^2$ to about 0.4 mg/cm$^2$, and more preferably from about 0.1 mg/cm$^2$ to about 0.3 mg/cm$^2$, and still more preferably from about 0.1 mg/cm$^2$ to about 0.2 mg/cm$^2$.

The pulse width, duty cycle and frequency of the pulse reverse voltage electrodeposition process should be adjusted to provide a particle size of the catalyst particles in the range of from about 3.0 nanometers to about 8.0 nanometers, preferably from about 3.0 nanometers to about 5.0 nanometers. When the particle size is in the defined ranges, the efficiency of the catalyst at the defined catalyst loading provides a rate of reaction that gives a power density, i.e., power produced per square centimeter of electrode, that is optimum for construction of proton exchange membrane fuel cells. It is important to retain the relatively small catalyst particle size and accessibility of the catalyst particles to the gas reagents and the proton exchange membrane that functions as the electrolyte, while providing a catalyst loading in the above-defined range. Although catalyst particles that are chemically deposited on a particulate catalyst support, e.g., carbon particles, may be of a size similar to that produced by the process of the invention, when they are incorporated into the catalytic layer of the GDE they are less available to the reagents. This may occur because some of the catalyst particles are not in good contact with the proton exchange membrane or because some of the carbon support particles might not be in electrical contact with one another and the backing layer. Evidently such catalyst particles are ineffective and cause the catalyst to be less efficient. This causes increased catalyst expense. The electrolytic deposition of catalyst assures that any catalyst particle is in electrical contact with a carbon support particle, and thereby with the backing layer, as well as with the proton exchange membrane, for it is only such locations that are accessible to the electrolyte from which the particles are deposited and the electrons supplied through the backing layer and catalyst support particles. On the other hand, merely increasing the amount of catalyst deposited electrolytically by the method of the prior art merely increases the size of the catalyst particles, with the result that the catalyst particles have less active surface area per unit weight than the smaller particles. Consequently, it is necessary to provide a catalyst support layer having both a catalyst loading and a catalyst particle size in the ranges defined above.

The process of the invention may be used to deposit any conventional catalytic metal or alloy. Suitable metals include platinum, palladium, rhodium, ruthenium, and alloys thereof. The plating bath may be any conventional plating bath used for electrodepositoin of these metals and alloys.

Figure 4:
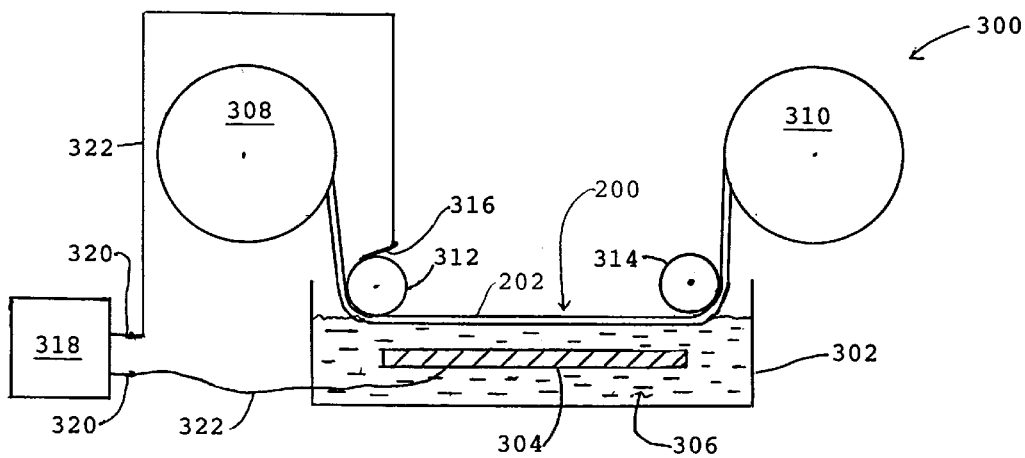
FIG. 4 illustrates schematically the reel-to-reel electrodeposition method of the invention.

FIG. 4 shows a preferred embodiment of the process of the invention carried out in a continuous plating apparatus 300. The apparatus 300 comprises a plating tank 302 having a counterelectrode 304 and containing a plating bath 306. The uncatalyzed gas diffusion electrode 200 is prepared in the form of a continuous web. The web is passed continuously over the surface of the plating bath 306. In the arrangement illustrated in FIG. 4, the web of uncatalyzed gas diffusion electrode is supplied on a supply reel 308. The web passes over guide and contact reel 312 positioned to place the catalyst support layer containing the uncatalyzed catalyst support particles in contact with the surface of plating bath 306. The backing layer 202 of the GDE is in electrical contact with the electrically conductive guide reel 312. Power supply 318 provides voltage for the electrodeposition through terminals 320, connections 322, and contact brush 316 to the guide and contact reel 312 and the counterelectrode 304. The web is moved across the surface of the plating bath at a rate such that it is in contact with the plating bath for a sufficient time for deposition of the predetermined amount of catalytic metal particles. The catalyzed gas diffusion electrode 200 then passes over guide reel 314 and is taken up on take-up reel 310. The gas diffusion electrode web 200 is moved over the surface of the plating bath 306 by drive means not shown acting on one or more of the supply reel 308, take-up reel 310, and/or guide reels 312 and 314. The continuous catalyzed gas diffusion electrode web so prepared may then be used in subsequent operations for the manufacture of fuel cells.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A method for depositing nanocrystalline particles of a catalytic metal on a substrate comprising
   immersing an electrically conductive substrate and a counterelectrode in bath containing ions of a metal to be deposited on said substrate;
   passing an electric current between said substrate and counter electrode;
   wherein
   said electric current is a pulsed electric current comprising pulses that are cathodic with respect to said substrate,
   said cathodic pulses have a duty cycle less than about 40%, and
   the frequency of said pulses ranges from about 10 hertz to about 5000 hertz.

2. The method of claim 1 wherein said frequency is between about 50 hertz and about 5000 hertz.

3. The method of claim 1 wherein said frequency is between about 100 hertz and about 3000 hertz.

4. The method of claim 1 wherein said frequency is between about 500 hertz and about 1500 hertz.

5. The method of claim 1 wherein said cathodic pulses have a duty cycle of from about 1% to about 30%.

6. The method of claim 1 wherein said cathodic pulses have a duty cycle of from about 2% to about 20%.

7. The method of claim 1 wherein said cathodic pulses have a duty cycle of from about 5% to about 15%.

8. The method of claim 1 wherein
   said electric current is a modulated reversing electric current comprising pulses that are cathodic with respect to said substrate and pulses that are anodic with respect to said substrate,
   said cathodic pulses have a duty cycle less than about 40% and said anodic pulses have a duty cycle not greater than about 90%,
   the charge transfer ratio of said cathodic pulses to said anodic pulses is greater than one, and
   the frequency of said pulses ranges from about 10 hertz to about 5000 hertz.

9. The method of claim 8 wherein an interval of no electric current flow is interposed between said cathodic pulses and succeeding anodic pulses.

10. The method of claim 8 wherein an interval of no electric current flow is interposed between said anodic pulses and succeeding cathodic pulses.

11. The method of claim 8 wherein an interval of no electric current flow is interposed between said cathodic pulses and succeeding anodic pulses and between said anodic pulses and is succeeding cathodic pulses.

12. The method of claim 8 wherein said cathodic pulses and said anodic pulses succeed each other without intervening intervals of no electric current flow.

13. The method of claim 8 wherein said cathodic pulses and said anodic pulses form a pulse train having a frequency between about 50 hertz and about 5000 hertz.

14. The method of claim 8 wherein said cathodic pulses and said anodic pulses form a pulse train having a frequency between about 100 hertz and about 3000 hertz.

15. The method of claim 8 wherein said cathodic pulses and said anodic pulses form a pulse train having a frequency between about 500 hertz and about 1500 hertz.

16. The method of claim 8 wherein said cathodic pulses have a duty cycle of from about 1% to about 30%.

17. The method of claim 8 wherein said cathodic pulses have a duty cycle of from about 2% to about 15%.

18. The method of claim 8 wherein said cathodic pulses have a duty cycle of from about 5% to about 10%.

19. The method of claim 8 wherein said anodic pulses have a duty cycle of from about 1% to about 90%.

20. The method of claim 8 wherein said anodic pulses have a duty cycle of from about 15% to about 50%.

21. The method of claim 8 wherein said cathodic pulses have a duty cycle of from about 20% to about 40%.

22. The method of claim 1 wherein said catalytic metal is selected from the group consisting of platinum, palladium ruthenium, rhodium, and alloys thereof.

23. A gas diffusion electrode for a proton exchange membrane fuel cell comprising
   a gas-permeable electrically conductive backing layer;
   a catalyst layer supported on said backing layer and comprising
      a particulate, electrically conductive catalyst support in contact with a proton exchange resin and in electrical contact with said backing layer, and
      a catalytic metal in finely divided form in electrical contact with said particulate catalyst support, said catalytic metal being present in the form of fine particles having diameter of from about 3.0 nanometers to about 8.0 nanometers and the loading of said catalyst being from about 0.1 mg/cm$^2$ to about 1.0 mg/cm$^2$,
   said particles of catalytic metal having been deposited by the method of claim 1.

24. A method of fabricating a gas diffusion electrode comprising
   1.) providing a gas-permeable electrically conducting backing web;
   2.) coating one major surface of said backing web with a layer of a particulate catalyst support in contact with a proton exchange resin binder;

3.) contacting said catalyst support layer with an electrolyte containing ions of a catalytic metal, said electrolyte having a counterelectrode immersed therein;

4.) passing an electric current between said catalyst support layer and said counterelectrode, wherein said electric current is a pulsed electric current comprising pulses that are cathodic with respect to said substrate, said cathodic pulses have a duty cycle less than about 40%, and the frequency of said pulses ranges from about 10 hertz to about 5000 hertz.

25. The method of claim 24 wherein said frequency is between about 50 hertz and about 5000 hertz.

26. The method of claim 24 wherein said frequency is between about 100 hertz and about 3000 hertz.

27. The method of claim 24 wherein said cathodic pulses and said anodic pulses form a pulse train having a frequency between about 500 hertz and about 1500 hertz.

28. The method of claim 24 wherein said cathodic pulses have a duty cycle of from about 1% to about 30%.

29. The method of claim 24 wherein said cathodic pulses have a duty cycle of from about 2% to about 20%.

30. The method of claim 24 wherein said cathodic pulses have a duty cycle of from about 5% to about 15%.

31. The method of claim 24 wherein said electric current is a modulated reversing electric current comprising pulses that are cathodic with respect to said substrate and pulses that are anodic with respect to said substrate, said cathodic pulses have a duty cycle less than about 40% and said anodic pulses have a duty cycle not greater than about 90%, the charge transfer ratio of said cathodic pulses to said anodic pulses is greater than one, and the frequency of said pulses ranges from about 10 hertz to about 5000 hertz.

32. The method of claim 31 wherein an interval of no electric current flow is interposed between said cathodic pulses and succeeding anodic pulses.

33. The method of claim 31 wherein an interval of no electric current flow is interposed between said anodic pulses and succeeding cathodic pulses.

34. The method of claim 31 wherein an interval of no electric current flow is interposed between said cathodic pulses and succeeding anodic pulses and between said anodic pulses and succeeding cathodic pulses.

35. The method of claim 31 wherein said cathodic pulses and said anodic pulses succeed each other without intervening intervals of no electric current flow.

36. The method of claim 31 wherein said cathodic pulses and said anodic pulses form a pulse train having a frequency between about 50 hertz and about 5000 hertz.

37. The method of claim 31 wherein said cathodic pulses and said anodic pulses form a pulse train having a frequency between about 100 hertz and about 3000 hertz.

38. The method of claim 31 wherein said cathodic pulses and said anodic pulses form a pulse train having a frequency between about 500 hertz and about 1500 hertz.

39. The method of claim 31 wherein said cathodic pulses have a duty cycle of from about 1% to about 30%.

40. The method of claim 31 wherein said cathodic pulses have a duty cycle of from about 2% to about 15%.

41. The method of claim 31 wherein said cathodic pulses have a duty cycle of from about 5% to about 10%.

42. The method of claim 31 wherein said anodic pulses have a duty cycle of from about 1% to about 90%.

43. The method of claim 31 wherein said anodic pulses have a duty cycle of from about 15% to about 50%.

44. The method of claim 31 wherein said cathodic pulses have a duty cycle of from about 20% to about 40%.

45. The method of claim 24 wherein said catalytic metal is selected from the group consisting of platinum, palladium ruthenium, rhodium, and alloys thereof.

46. A method according to claim 24 wherein a continuous length of said backing web with said catalyst support layer coated thereon is passed sequentially into contact with said electrolyte.

47. A gas diffusion electrode for a proton exchange membrane fuel cell comprising a gas-permeable electrically conductive backing layer;

a catalyst layer supported on said backing layer, said catalyst layer having a thickness in a range of from about 0.1 micrometer to about 15 micrometers and comprising a particulate, electrically conductive catalyst support dispersed in a proton exchange resin and in electrical contact with said backing layer, and a catalytic metal in finely divided form in electrical contact with said particulate catalyst support, said catalytic metal being present in the form of fine particles having diameter of from about 3.0 nanometers to about 8.0 nanometers and the loading of said catalyst being from about 0.1 mg/cm$^2$ to about 1.0 mg/cm$^2$.

48. The electrode of claim 47 wherein said catalyst layer has a thickness in a range of from about 0.3 micrometers to about 10 micrometers.

49. The electrode of claim 47 wherein said catalyst layer has a thickness in a range of from about 0.3 micrometers to about 6 micrometers.

50. The electrode of claim 47 wherein said catalyst particles have a diameter in a range of from about 3.0 nanometers to about 5.0 nanometers.

51. The electrode of claim 47 wherein said catalyst loading is in a range of from about 0.1 mg/cm$^2$ to about 0.3 mg/cm$^2$.

* * * * *